United States Patent [19]

Sekine et al.

[11] 4,258,371

[45] Mar. 24, 1981

[54] IMAGE RECORDING APPARATUS

[75] Inventors: Yoichi Sekine; Yoshio Kishimoto, both of Hirakata; Wataru Shimotsuma, Ibaraki, all of Japan

[73] Assignee: Matsushita Electric Industrial Co., Ltd., Osaka, Japan

[21] Appl. No.: 94,588

[22] Filed: Nov. 15, 1979

[30] Foreign Application Priority Data

| | | | |
|---|---|---|---|
| Nov. 20, 1978 | [JP] | Japan | 53-143700 |
| Nov. 24, 1978 | [JP] | Japan | 53-145495 |
| Nov. 24, 1978 | [JP] | Japan | 53-145496 |
| Jan. 19, 1979 | [JP] | Japan | 54-5091 |
| Oct. 15, 1979 | [JP] | Japan | 54-133254 |
| Oct. 15, 1979 | [JP] | Japan | 54-133255 |

[51] Int. Cl.³ .............................................. G01D 15/16

[52] U.S. Cl. ........................ 346/140 R; 101/DIG. 13; 346/74.2

[58] Field of Search ..................... 346/140 R, 74.1, 75; 101/1, DIG. 13; 400/126

[56] References Cited

U.S. PATENT DOCUMENTS

| | | | |
|---|---|---|---|
| 3,787,879 | 1/1974 | Ichioka | 346/140 R |
| 4,047,185 | 9/1977 | Phillips | 346/140 R |
| 4,166,277 | 8/1979 | Cield | 346/140 R |

*Primary Examiner*—Joseph W. Hartary
*Attorney, Agent, or Firm*—Stevens, Davis, Miller & Mosher

[57] ABSTRACT

An image recording apparatus comprising an array of styli regularly electrically connected at intervals of an integer of styli and an array of opposite electrodes each of which is disposed opposite to a plurality of styli, and either the styli or the opposite electrodes are made of a magnetic material. A protuberance of a magnetofluidic material, which is called magnetic ink herein, is formed on the tip of each stylus or each opposite electrode of magnetic material. A pluse signal having a constant frequency is applied in dot sequential fashion to one of the stylus array and the opposite electrode array, and a signal corresponding to an image is applied to the other, so that the protuberances of the magnetic ink formed on the selected styli or opposite electrodes in the stylus array and opposite electrode array applied with the two signals simultaneously fly toward a recording surface to obtain a desired image thereon.

17 Claims, 14 Drawing Figures

IMAGE RECORDING APPARATUS

This invention relates to an image recording apparatus of the kind adapted for recording a desired image on a recording sheet of plain paper by forming sources of dots of magnetic ink in a fashion protuberant on the tips of individual electrodes of magnetic material utilizing the magnetic force and letting the protuberances of magnetic ink to fly toward and onto the recording sheet of plain paper utilizing the coulomb force.

It is a primary object of the present invention to provide an image recording apparatus which can stably record a desired image of high quality on a recording sheet of plain paper with a high recording density.

Another object of the present invention is to provide an apparatus of the kind above described which can operate at an increased speed of recording, and in which the number of parts in its signal application circuit is reduced to less than that of prior art apparatus of this kind.

An electrostatic recording apparatus was already known as an image recording apparatus of the kind comprising an array of a plurality of styli and an array of a plurality of electrodes disposed opposite to the styli, and a heat-sensitive recording apparatus analogous to such an apparatus was also already known. However, these known image recording apparatus are only capable of recording an image on a recording sheet of processed paper or like special recording medium in view of the principle of recording and are fundamentally distinguished from the image recording apparatus according to the present invention in that they are not capable of directly recording an image on a recording sheet of plain paper.

A so-called ink jet recording method was also already known as a means for directly recording an image on a recording sheet of plain paper. Due to, however, the fact that an image recording apparatus based on this known method comprises a plurality of fine-apertured nozzles, a very precise and special technique is required for the fabrication of such nozzles, and means for preventing plugging of the nozzles is also required. Further, it is extremely difficult to arrange the nozzles for achieving recording of an image with a high recording density and to independently control the individual nozzles.

In contradistinction, the image recording apparatus according to the present invention is advantageous over the prior art apparatus of this kind in that the formation of independent sources of dots of magnetic ink in a fashion protuberant on the tips of stiyli or opposite electrodes of magnetic material facilitates achievement of the desired high recording density and that the elimination of the nozzles greatly simplifies the design and maintenance of the component parts.

The inventors have already disclosed such an apparatus and showed part of the construction of the present invention in an earlier patent application: U.S. patent application Ser. No. 924,872 filed July 14, 1978.

The present invention is based on the results of further researches and studies for making improvements in the image recording apparatus disclosed in the aforementioned patent application and contemplates the provision of signal application means most suitable for use in such an image recording apparatus.

In accordance with the present invention, there is provided an image recording apparatus of the kind comprising an array of styli arranged in equally spaced apart relation on the same plane and regularly electrically connected at intervals of an integer of styli, an array of opposite electrodes arranged in equally spaced apart relation and in parallel with the stylus array, each of the opposite electrodes in the opposite electrode array being disposed opposite to a plurality of the styli in the stylus array, either the styli or the opposite electrodes being made of a magnetic material, and means for supplying a magnetofluidic material toward the tips of the styli or the opposite electrodes of magnetic material thereby forming protuberances of the magnetofluidic material on the tips by the magnetic force and letting the protuberances of the magnetofluidic material to selectively fly toward and onto a recording surface of a recording sheet for providing a record of a reproduced image on the recording surface of the recording sheet, wherein a pulse signal having a constant frequency is applied in dot sequential fashion to one of the stylus array and the opposite electrode array, and a signal corresponding to an image is applied to the other.

The above and other objects, features and advantages of the present invention will become more apparent from the following detailed description taken in conjunction with the accompanying drawings, in which:

FIGS. 1*a* and 1*b* are a schematic plan view and a schematic side elevation view respectively showing the structure of one form of the magnetic stylus type of recording head employed in the image recording apparatus according to the present invention;

FIGS. 2*a*, 2*b* and FIG. 3 show schematically the shape of protuberances of magnetic ink formed in response to the magnetic force of a magnet, which shape is variable depending on the shape of the magnet;

A fluidic material having a magnetic property (magnetic ink) is employed in the present invention to record an image on a recording sheet of plain paper. The fluidic material of this kind is broadly classified into a solid magnetic material in particle form and a colloidal liquid prepared by dispersing fine particles of a magnetic material in a liquid dispersion medium. The solid magnetic material in particle form includes magnetite, ferrite or the like in particle form, and a magnetic toner of one-component system used for electrostatic recording belongs to this solid particulate magnetic material. In order to increase the blackness and conductivity, carbon black and a suitable conductive material such as a powdery conductive metal or a high-molecular electrolyte are generally added to the solid particulate magnetic material, and a binder is also added to the mixture, the above composition being then granulated by a granulating mill.

The colloidal liquid is commonly called a magnetofluidic material and is generally prepared by dispersing fine particles (about 100 Å in particle size) of magnetite ($Fe_3O_4$) together with a surface active agent in a liquid dispersion medium. This colloidal liquid is black in color and remains stable over a long period of time without any precipitation or aggregation of the particles. The dispersion medium preferably used to prepare this magnetofluidic material is paraffin, water, ester oil, silicone oil or the like. The surface active agent preferably used for the preparation of the magnetofluidic material is a cationic active agent, a nonionic active agent or the like besides a carboxylic acid such as oleic acid or linolic acid. It is said that the magnetofluidic material exhibits a superparamagnetic property, whereas the magnetic toner exhibits a ferromagnetic property. Thus, this magnetofluidic material does not undergo any magnetic hysteresis in its behavior. In the present invention, this magnetofluidic material is used as the magnetic ink for recording an image on a recording sheet, by way of example.

The styli or opposite electrodes in the apparatus according to the present invention are preferably made of a soft magnetic material such as pure iron, a stainless steel, an iron-nickel alloy, nickel or permalloy showing a higher degree of permeability than the magnetic ink and are provided by etching a thin sheet of such a material into strips or cutting such a thin sheet into reeds (reed frame) or wires.

Preferred embodiments of the present invention for providing a record by forming sources of dots of magnetic ink in a fashion protuberant on the tips of the styli, which are in the form of wires of magnetic material, will now be described in detail with reference to the drawings.

Figure 1A:
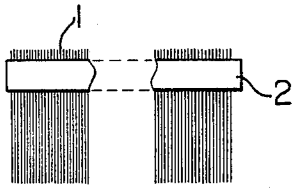
Figure 1B:
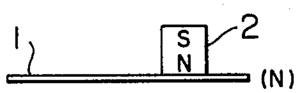

Referring now to FIGS. 1*a* and 1*b* showing the structure of one form of the magnetic stylus type recording head employed in the image recording apparatus according to the present invention, an array of styli 1 made of a magnetic material such as pure iron or a stainless steel having a high permeability are arranged in equally spaced apart relation on a plane. A magnet 2 such as a so-called rubber magnet or a so-called plastic magnet magnetized in a direction as shown in FIG. 1*b* is bonded to the styli 1 at a position slightly spaced from the tips of the styli 1 as shown in FIG. 1*a*. This magnet 2 is obtained by cutting a sheet of such a magnet into an elongated strip form. Although the magnet 2 is shown in FIG. 1*b* to have the illustrated polarity, the effect of the magnetic action is the same even when the direction of magnetization is reverse to that shown in FIG. 1*b*.

Figure 2A:
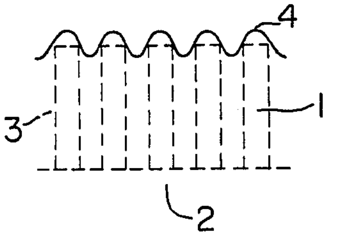
Figure 2B:
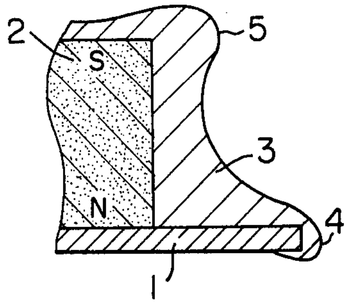

FIGS. 2*a* and 2*b* show schematically the shape of protuberances of magnetic ink 3 supplied to the magnetic stylus type recording head. This magnetic ink 3 is prepared by dispersing fine particles (about 100 Å to 200 Å in particle size) of magnetite or $\gamma$-ferrite in a medium such as a non-volatile hydrocarbon oil having a low viscosity and a high insulation, and adjusting the resistivity and magnetic saturation of the dispersion to $10^7$–$10^9\Omega\cdot$cm and 200–400 gauss respectively. It will be seen in FIGS. 2*a* and 2*b* that the magnetic ink 3 spreads to cover the magnetic styli 1 and magnet 2 and is protuberant on the tips of the styli 1. The number of these protuberant ink portions is equal to the number of the styli 1, and protuberances 4 of the magnetic ink 3 are formed on the tips of the styli 1 as seen in FIG. 2*a*.

Figure 3:
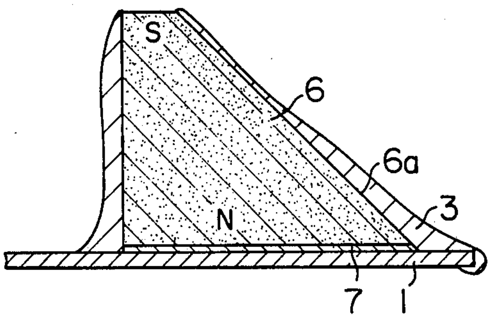

Thus, the magnetic ink 3 deposits on the tip of each stylus 1 to form such a protuberance 4 thereon as seen in FIG. 2*b*. However, another protuberant ink portion 5 is simultaneously formed due to the shape of the magnet 2 as also seen in FIG. 2*b*. This latter protuberant ink portion 5 is not distinguished from the former protuberant ink portion 4 and tends to provide a source of noises during image recording. According to the present invention which obviates this defect, the magnetic stylus type recording head is constructed in a manner as shown in FIG. 3 in which it will be seen that a permanent magnet 6 having a surface 6*a* making an acute angle with the magnetic pole surface is bonded to the array of the styli 1. A bonding material layer 7 is shown interposed between the magnet 6 and the styli 1. This bonding material layer 7 is effective in stabilizing the protuberances of the magnetic ink 3 when its thickness is less than the value which is two times the diameter of the stylus 1. Further, in the recording head including the magnet 6 having such an acute angled surface 6*a*, the corrugation in the shape of the protuberances of the magnetic ink 3 is eliminated, and undesirable recording noises do not occur. The acute angle defined between the array of the styli 1 and the magnet surface 6*a* is determined taking into consideration the strength of the magnetic force at the tip of each stylus 1 and also the adverse effect of recording noises. This angle is preferably about 30° and 60° and is selected to be 45° in the form shown in FIG. 3.

The magnet 6 actually employed in the present invention is a so-called rubber magnet obtained by dispersing powders of barium ferrite in nitrile rubber and in the form of a sheet 1 mm thick, 5 mm wide and 200 mm long. As described hereinbefore, intimate engagement between the magnet material and the stylus 1 is important, and from this aspect, the rubber magnet or plastic magnet is suitable for the purpose.

Figure 4:
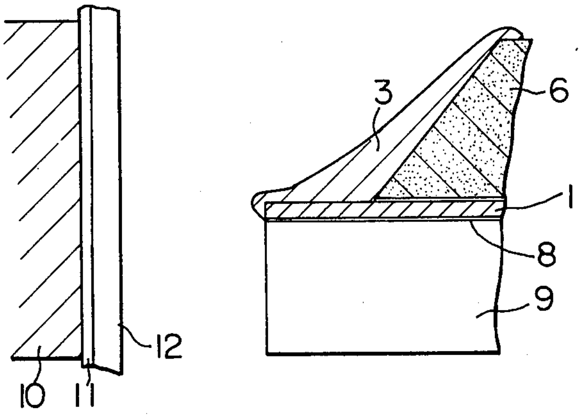
FIG. 4 shows schematically the structure of the recording section in a first embodiment of the present invention.
Figure 5:
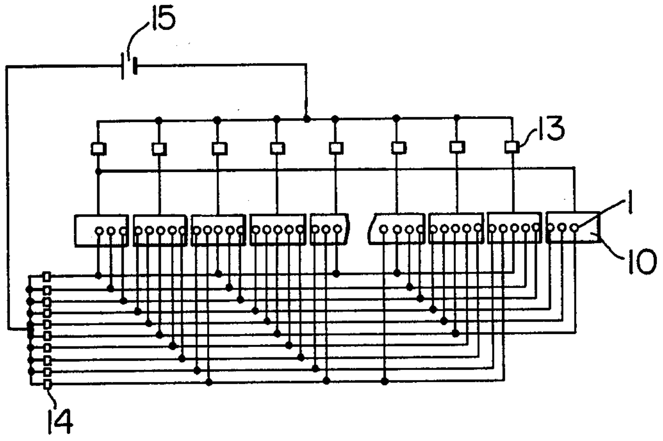
FIG. 5 shows the positional relation between the array of styli and the array of opposite electrodes in the first embodiment of the present invention.

FIG. 4 shows the structure of the recording section in a first embodiment of the present invention. In FIG. 4, each magnetic stylus 1 is in the form of a wire of pure iron having a diameter of 60$\mu$, and is covered with an urethane coating 8 having a thickness of 10$\mu$. However, this urethane coating 8 is stripped from the tip portion of the magnetic stylus 1 at the portion protruding beyond the end edge of the magnet 6. The magnetic styli 1 are arranged in equally spaced apart relation on a substrate 9 of epoxy resin, and the line density of the magnetic styli 1 is 8 per mm. The rubber magnet 6 described above is bonded to the array of the styli 1 at a position spaced by 0.5 mm from the tips of the styli 1. An array of electrodes 10 are disposed opposite to the array of the 1 in FIG. 4, and each electrode is made of a conductive metal material in the form of a square bar of 3.5 mm × 3.5 mm in its sectional area. Such electrodes 10 are arranged at a pitch of 4 mm to form the array. A recording sheet 12 is paper of fine quality having a thickness of 60$\mu$. This recording sheet 12 is preferably as thin as possible. This is because, when the sheet thickness is extremely large or exceeds 250$\mu$, the fidelity of response to a signal is degraded tending to produce noises thereby rendering the record unclear. In practical applications, the thickness of the recording sheet 12 is preferably between 40$\mu$ and 100$\mu$. The distance between the front end of the magnetic stylus type recording head and the opposite electrodes 10 is selected to be 0.3 mm. A dielectric layer 11 is disposed in FIG. 4 for the purpose of preventing spark discharge occurring due to the application of a high voltage across the array of the styli 1 and the array of the opposite electrodes 10. In this embodiment, any one of dielectric materials exhibiting a high resistance such as cellophane, polyurethanes, triacetates, polyesters and teflon can be used as the material of the dielectric layer 11. The thickness of this dielectric layer 11 is advantageously as thin as possible within the allowable range in which the dielectric material exhibits its dielectric strength. In this embodiment, a commarcially available cellophane tape about 60μ thick is used to provide this dielectric layer 11. FIG. 5 shows the positional relation between the array of the styli 1 and the array of the opposite electrodes 10 in a way to be readily understood. That is, FIG. 5 illustrates how the styli 1 are disposed relative to the opposite electrodes 10. The total number of the opposite electrodes 10 is 41, and the total number of the styli 1 is 1280. The arrangement is such that the styli 1 are electrically connected at intervals of 64, and the leftmost and rightmost ones of the styli 1 in FIG. 4 are located opposite to the center of the associated opposite electrodes 10, respectively. That is, the 1st stylus 1 counting from the left-hand end of the array of the styli 1 is located opposite to the center of the associated odd-numbered opposite electrode 10, while the 33rd stylus 1 is located opposite to the center of the associated even-numbered opposite electrode 10, and so on. A signal source 13 is connected to each of the opposite electrodes 10 to apply a signal thereto. Another signal source 14 is connected to each of the stylus groups to apply a signal thereto, that is, there are 64 signal sources 14. A bias power source 15 applies a bias voltage across the array of the styli 1 and the array of the opposite electrodes 10 and is connected in such a manner that the terminal to be connected to the recording electrodes is positive relative to the other terminal. The signal sources 13 and 14 apply their output signals in a direction in which the strength of the electric field between the styli 1 and the opposite electrodes 10 is more intensified. More precisely, the signal sources 13 are connected to the electrodes which are more negative than those disposed opposite thereto, and the signal sources 14 are connected to the styli 1 which are more positive than those disposed opposite thereto. In FIG. 5, the styli 1 are more positive than the electrodes disposed opposite thereto so as to inhibit occurrence of discharge and to ensure stable recording. In the electrode arrangement shown in FIG. 5, flying of the magnetic ink occurs only when signal voltages are applied to both of the selected styli 1 and the associated opposite electrodes 10, and the bias voltage of the bias power source 15 is suitably adjusted to attain the above purpose. The bias voltage of 1.0 kV was found suitable when the signal voltages from the signal sources 13 and 14 were 500 V.

The electrode arrangement shown in FIG. 5 is advantageous in that a record can be provided at a recording speed which is twenty or more times as high as when the recording is made with only one stylus and that the number of parts of the signal drive circuits required for the signal sources 13 and 14 associated with the 1280 styli can be reduced to $[64+(41-1)]=104$. Thus, when the signals are applied from the signal sources 14 and 13 to the styli 1 and to the opposite electrodes 10 respectively for the recording of an image, a clear record in black color having a width of 160 mm can be reproduced on the white background.

It will be understood from the above description of the first embodiment of the present invention that a record is produced by the flying magnetic ink 3 in response to the application of the signal voltages to both of the selected styli 1 and the associated opposite electrodes 10. The plural opposite electrodes 10 are disposed electrically independent of each other, and each of them is spaced apart from the adjacent ones. Thus, when a stylus 1 located opposite to the interelectrode space or gap is associated with a single opposite electrode 10 (or a pair of opposite electrodes 10), its response to the signal tends to become unstable. Therefore, in order that such a stylus 1 disposed opposite to the interelectrode space or gap can respond to the signal with the high fidelity too, it is preferable that each individual stylus 1 is associated with two or more opposite electrodes 10 (or two or more pairs of opposite electrodes 10). From the above viewpoint, the relation between the total number of the styli 1 and the total number of the opposite electrodes 10 (or electrode pairs) is desirably as follows:

The total number of the styli 1 is $(n \times m)$ (where n and m are integers). and the total number of the opposite electrodes 10 (or electrode pairs) is $(2m+1)$, when the styli 1 are electrically connected at intervals of n. In this case, the number of the signal control parts is $(n+2m)$.

Description will now be directed to means for applying the signals to the styli 1 and opposite electrodes 10 which are the essential parts of the present invention.

Figure 6:
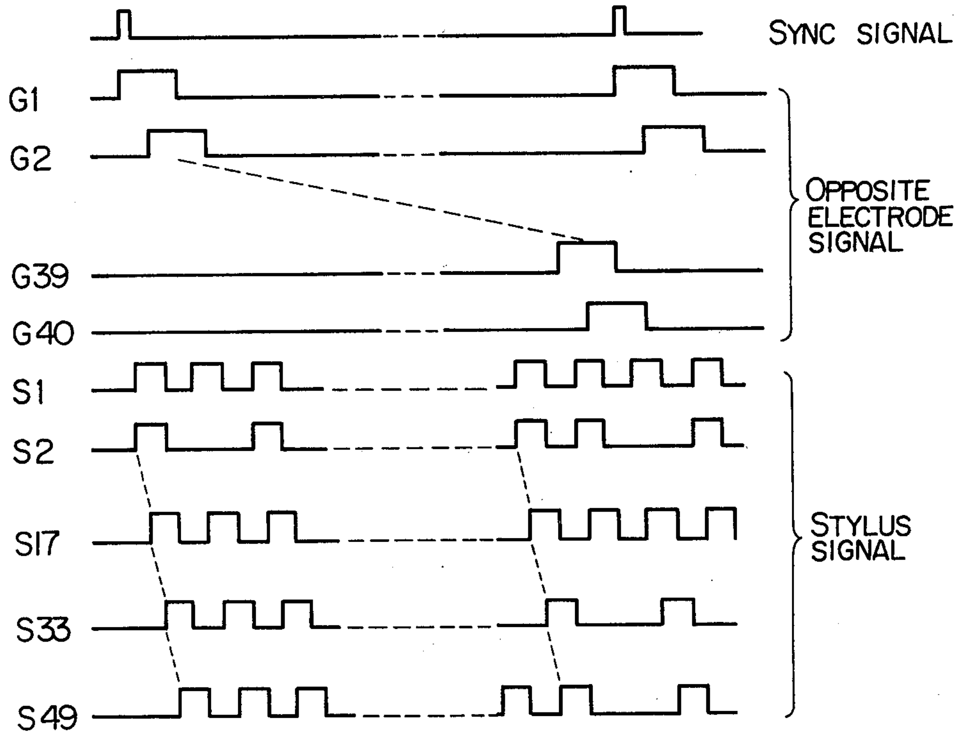
FIGS. 6, 7 and 8 are time charts showing different forms of signal application means according to the present invention.

It is the most important feature of the present invention that a pulse signal having a fundamentally constant frequency is applied to one of the opposite electrode array and the stylus array in dot sequential fashion, and a signal corresponding to an image signal is applied to the other. Part of the image signal may be omitted as a result of band compression for the purpose of improving the recording speed, and the frequency of the constant-frequency signal to be constant in frequency may be partly altered. Such a case is also included in the scope of the present invention. FIG. 6 is a time chart of one form of the signal application means according to the present invention. The symbol G1 in FIG. 6 designates a pulse signal applied to the leftmost opposite electrode 10 in FIG. 5 in synchronism with a synchronizing signal, and its pulse width is selected to be 800 μs taking into consideration the fidelity of response of a stylus 1 disposed opposite to the aforementioned interelectrode space or gap. The symbols G2, G3, . . . , G39, G40 designate similar pulse signals applied respectively to the opposite electrodes 10 arranged in sequential order, and it will be seen that the pulses having the pulse width of 800 μs are sequentially applied to the array of the opposite electrodes 10 for scanning at time intervals of 400 μs.

The symbol S1 in FIG. 6 designates a pulse signal applied to the leftmost stylus 1 in FIG. 5. This pulse signal rises in 200 μs after the application of the synchronizing signal and is a train of pulses having a pulse width of 400 μs applied at a period of 800 μs depending on the presence or absence of an image signal. The symbols S2, . . . , S17, . . . , S33, . . . S49 designate similar pulse signals applied to the array of the styli 1 arranged in sequential order. The signal S2 is applied in (800 μs÷64)=12.5 μs after the rise time of the signal S1, and so on.

It will be understood from the above description that, although a length of time of 400 μs is required for forming one dot by the flying magnetic ink as a matter of fact, the length of time actually required for the formation of such one dot can be apparently reduced to 12.5 μs, and the recording speed can be correspondingly increased by the unique combination of the styli 1 with the opposite electrodes 10 and also by the overlapped timing of the signal application to the individual styli 1.

Figure 7:
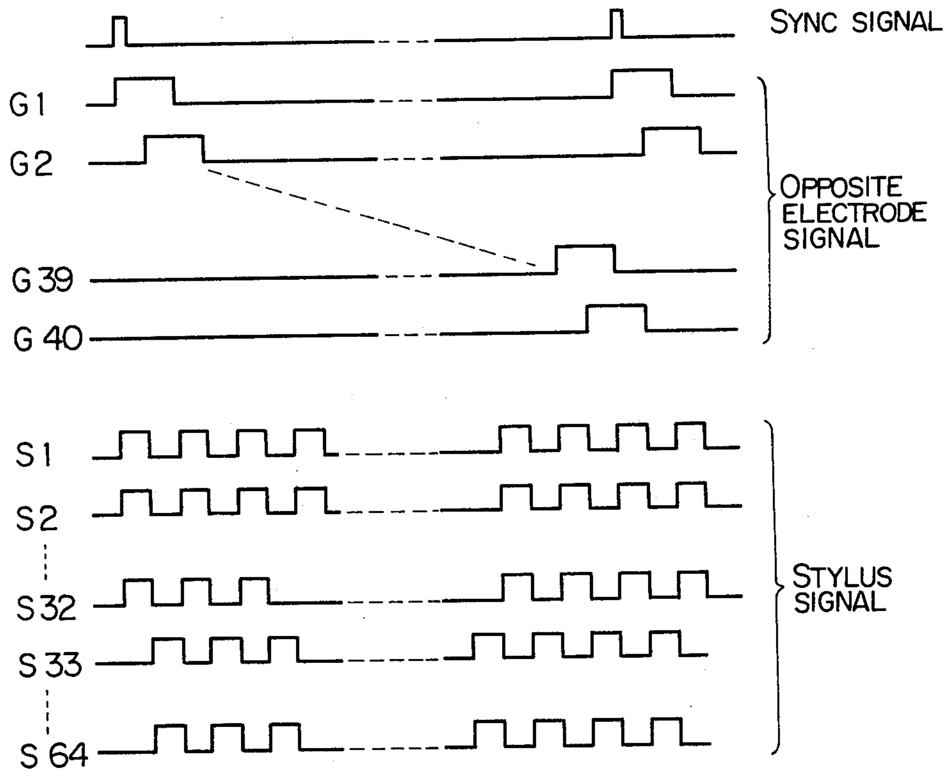

FIG. 7 shows another form of the signal application means analogous to that shown in FIG. 6. The manner of signal application to the opposite electrodes 10 in FIG. 7 is entirely similar to that described with reference to FIG. 6. The signal application means shown in FIG. 7 is featured by the fact that the pulse signals applied to the 1st stylus to the 32nd stylus rise at the same time, and those applied to the 33rd stylus to the 64th stylus rise also at the same time, in each of the groups of the 32 styli. Actually, in concurrent relation with the application of the synchronizing signal, that is, in concurrent relation with the rise time of the pulse signals applied to the odd-numbered opposite electrodes 10, the pulse signals applied to the 1st stylus to the 32nd stylus rise and last for 400 μs depending on the presence or absence of an image signal. Then, in concurrent relation with the rise time of the pulse signals applied to the even-numbered opposite electrodes 10, the pulse signals applied to the 33rd stylus to the 64th stylus similarly rise and last for 400 μs depending on the presence or absence of an image signal. The form shown in FIG. 7 is entirely similar to that shown in FIG. 6 in that the flying point of the magnetic ink moves from the left-hand end toward the right-hand end of the stylus array in FIG. 5 to reproduce an image or a record. In the two forms shown in FIGS. 6 and 7, image recording can be relatively stably achieved when the line density of the styli 1 is 6 per mm or less than that. However, when the line density of the styli exceeds 8 per mm, continuation of recording operation tends to result in such a drawback that the image quality is deteriorated with time. Such a deterioration in the image quality is considered to result from the fact that an intense electric field is established in the narrow interelectrode space or gap, and a space charge is formed or built up in the magnetic ink due to the presence of such an intense electric field, although the electrical resistance of the magnetic ink is very high. Although the length of time giving rise to such a drawback varies depending on the pattern of an image to be recorded, continuation of recording operation over about 10 minutes or more results in a relative reduction of the signal level due to what is likely to be attributable to the aforementioned build-up of the space charge in the magnetic ink thereby obstructing the flying of the magnetic ink toward the recording sheet in spite of the application of the electrical signals to the selected styli 1. This phenomenon is called herein a "memory phenomenon" since it is caused by the application of a non-periodic intense electric field to the space or gap between the styli 1. Further, in the two forms shown in FIGS. 6 and 7, two styli 1 disposed next adjacent to a stylus 1 to which a signal corresponding to an image signal is applied have different voltage levels as a matter of fact. In other words, a non-uniform electric field is built up to deflect the flying path of the magnetic ink, and the magnetic ink does not fly along the straight path resulting in a non-clear record. The trouble due to the aforementioned "memory phenomenon" or due to the non-straight flying of the magnetic ink does not provide any substantial problem when the line density of the styli 1 is relatively low, that is, when the styli 1 are spaced apart from each other by a relatively large distance in the stylus type recording head used for recording. However, this trouble becomes substantial to such an extent that a serious problem arises to obstruct successful recording when the line density of the styli 1 is as high as 8 per mm or more.

These problems can be obviated by arranging the signal application means in a manner as described presently. Signals corresponding to an image signal are applied to the odd-numbered styli 1 in each group of 64 styli as in the form described with reference to FIG. 6, and then, similar signals are applied to the even-numbered styli 1. In other words, image recording is carried out while skipping one of the styli 1 in the two adjacent styli 1. The effect was substantially the same when two or more styli 1 were skipped. Although the recording speed is reduced when the signals are applied in the manner above described, the aforementioned "memory phenomenon" is substantially eliminated, and the phenomenon of flying of the magnetic ink along the non-straight path is also completely eliminated, so that a clear record can be obtained.

Further, due to the fact that a high voltage is applied across the array of the opposite electrodes 10 and the array of the styli 1 in the apparatus according to the present invention, a variation in the environmental conditions tends to frequently cause electric discharge which seems to be corona discharge, and this electric discharge occurs at a probability of 5% or less although it does not occur so frequently or continuously. Occurrence of such discharge results in an extreme reduction in the strength of the electric field applied between the array of the opposite electrodes 10 and the array of the styli 1, thereby obstructing the flying of the magnetic ink toward the recording sheet. As a consequence, a horizontal array of 32 dots or 64 dots will be missed from the record, and a white streak will appear on the recording surface of the recording sheet in the case of the aforementioned forms of the signal application means. This missing phenomenon due to the electric discharge tends to frequently appear also with the increase in the line density of the styli 1. Even in the third form of the signal application means in which the alternate styli 1 are skipped during image recording, the missing phenomenon occurs still and cannot be completely eliminated.

Figure 8:
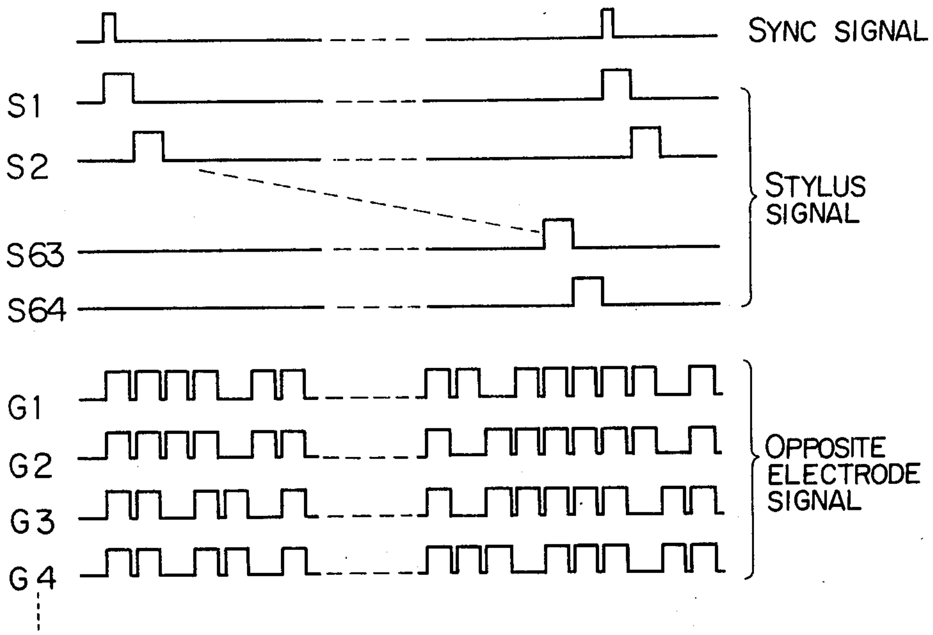

The inventors have succeeded in providing a more excellent signal application means capable of eliminating all of the aforementioned "memory phenomenon", the phenomenon of non-straight flying of the magnetic ink and the missing phenomenon due to the electric discharge, and this improved signal application means has been able to provide good results. FIG. 8 is a time chart of the improved signal application means. According to this signal application means, a pulse having a pulse width of 400 μs is applied only once to each stylus during recording one line of an image. Referring to FIG. 8, a pulse signal applied to the 1st stylus 1 rises in synchronism with a synchronizing signal and lasts for 400 μs, and similar signals are applied sequentially to the 2nd stylus, 3rd stylus, . . . , and 64th stylus at delay times of 400 μs. That is, scanning pulse signals having a constant frequency independent of an image signal are sequentially applied to the styli 1 in dot sequential fashion. On the other hand, pulse signals processed to correspond to the image are sequentially applied to the opposite electrods 10. In this case, in order to ensure the fidelity of response of the styli 1 disposed opposite to the interelectrodes gaps between the opposite electrodes 10, the pulse signals corresponding to the image are applied to the combination of the electrode pairs such as the pair of the 1st and 2nd opposite electrodes, the pair of the 3rd and 4th opposite electrodes, . . . , the pair of the 39th and 40th opposite electrodes in concurrent relation with the application of the pulse signals to the 1st styls to the 32nd stylus in the group of 64 styli. Then, the signals corresponding to the image are applied to the combination of the electrode pairs, such as the pair of the 2nd and 3rd opposite electrodes, the pair of the 4th and 5th opposite electrodes, . . . , the pair of the 38th and 39th opposite electrodes, and the pair of the 40th and 41st opposite electrodes in concurrent relation with the application of the signals to the 33rd stylus to the 64th stylus. The signal applied to each of the opposite electrodes 10 rises fundamentally in concurrent relation with the rise time of the signal applied to the associated styli 1 so that the magnetic ink can sufficiently fly toward the recording sheet during the period of signal application to each stylus 1 or within the period of 400 μs in this case. The aforementioned space charge cannot build up because the pulse signal is necessarily applied at the next moment to the stylus 1 next adjacent to the stylus 1 to which the signal has been applied. Thus, when the signal is being applied to one of the styli 1, no signals are applied to the two styli 1 next adjacent to that stylus 1, and no voltage is applied thereto, so that a uniform electric field can be always maintained, and the trouble such as the phenomenon of non-straight flying of the magnetic ink toward the recording sheet would not occur. Further, due to the fact that no voltage is fundamentally applied to more than two consecutive styli 1 at the same time in the improved signal application means shown in FIG. 8, the possibility of occurrence of electric discharge is far less than in the case of the forms described with reference to FIGS. 6 and 7. Even if electric discharge might occur, only one dot would be missed from the record without substantially being perceived by the eyes, and a very clear record can be obtained. In the description given with reference to FIGS. 6, 7 and 8, the signal pulses of rectangular waveform are merely illustrated for conveniences of explanation. It is apparent, however, that a burst waveform or a sine waveform may be employed in lieu of the rectangular waveform to exhibit the same effect.

Figure 9:
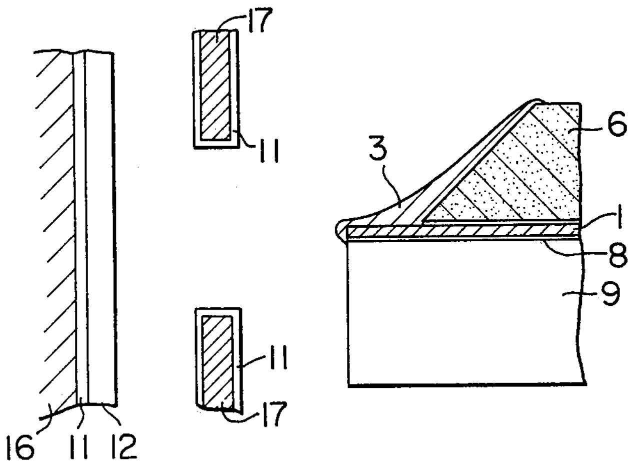
FIG. 9 shows schematically the structure of the recording section in a second embodiment of the present invention.

The structure of the recording section in the first embodiment described with reference to FIG. 4 is such that the quality of record is dependent upon the thickness and conductiviting of the recording elements in view of its basic principle. FIG. 9 shows the structure of the recording section in a second embodiment which is basically free from being affected by such factors. Referring to FIG. 9, an array of pairs of opposite electrodes 17 are disposed in such a relation that an elongated slit is defined therebetween to permit flying of the magnetic ink toward and onto a recording sheet 12. A supporting member 16 supports the recording sheet 12 in position. This supporting member 16 may be made of an electrical insulating material. However, it is more preferable that this member 16 is made of an electrical conductive material, and a DC voltage is applied across the opposite electrodes 17 and the supporting member 16 in such a relation that the potential level at the supporting member 16 is lower than that at the opposite electrode pairs 17. A dielectric layer 11 is shown associated with the opposite electrodes 17 and also with the supporting member 16 to prevent occurrence of arc discharge. The dielectric material forming the dielectric layer 11 covering the opposite electrode pairs 17 has preferably a lowest possible resistance within the allowable range of the dielectric strength, and that having a volume resistivity of $10^8$–$10^{14}$ Ω·cm was found most suitable for the purpose. In actual applications, a cellophane tape was used to provide the dielectric layers 11.

Figure 10:
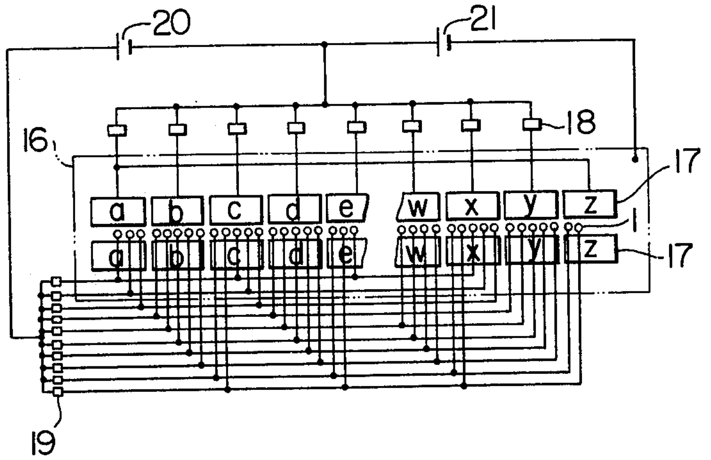
FIG. 10 shows the positional relationship between the array of styli and the array of opposite electrodes in the second embodiment of the present invention.

FIG. 10 shows the positional relation between the array of the styli 1 and the array of pairs of the opposite electrodes 17 in the second embodiment of the present invention. The opposite electrodes 17 in the array have a sectional area of 3.5 mm×3.5 mm and are arranged at a pitch of 4 mm. Those designated by the same letter of the alphabet are electrically connected to each other and are therefore equivalent in potential. The tips of the array of the styli 1 are disposed in parallel with the slit. Signal sources 18 and 19 are provided for the opposite electrodes 17 and the styli 1 respectively, and bias power sources 20 and 21 are connected in the illustrated polarities. The manner of signal application is similar to that described with reference to FIG. 5, and bias voltages are applied in a direction in which the electric field between the stvli 1 and the opposite electrodes 17 is intensified. In this case too, the styli 1 are maintained positive relative to the opposite electrodes 17 as in the first embodiment. The number of the styli 1 is the same as that in the first embodiment, and 41 pairs of the opposite electrodes 17 are provided.

An image recording test was conducted while varying the distance between the recording sheet 12 and the opposite electrodes 17 within the range of 0 mm and 2 mm, varying the width of the slit between the opposite electrodes 17 within the range of 0.3 mm and 1 mm, and maintaining the distance between the front end of the recording head and the opposite electrodes 17 at 0.3 mm. The test results proved that the resolution was better when the distance between the recording sheet 12 and the opposite electrodes 17 was selected to be as short as possible, and the required signal voltages or bias voltages were substantially the same in the slit width range of 0.3 mm and 0.75 mm and had to increased in the slit width range more than 0.75 mm. An image was then recorded on the recording sheet 12 while maintaining the distance between the recording sheet 12 and the opposite electrodes 17 at 0.5 mm, maintaining the slit width at 0.5 mm, applying a DC voltage of 700 V across the opposite electrodes 17 and the supporting member 16, setting the bias voltage of the bias power sources 20 and 21 at 1.6 kV, and setting the signal voltages from the signal sources 18 and 19 at 500 V. Also, as in the first embodiment, various signal application means were studied, but any especial difference due to the modified structure of the recording section was not observed.

This second embodiment comprising the pairs of the opposite electrodes 17 having the slit defined therebetween is advantageous in that the record is not affected by the property or quality of the recording sheet. In addition, this embodiment is advantageous in that undesirable engagement between the recording sheet and the recording head is prevented during insertion of the recording sheet in position, and deposition of dust and like foreign matters on the recording head is also prevented.

The aforementioned embodiments have such a construction that the styli are made of a magnetic material, and a protuberance of magnetic ink is formed on the tip of each stylus by the magnetic force. Description will then be directed to another embodiment in which the opposite electrodes are made of a magnetic material, and a protuberance of magnetic ink is formed at the tip of each opposite electrode.

This third embodiment of the present invention is featured by the fact that the aforementioned magnet of special shape is not provided on the styli requiring a complex wiring arrangement, and the magnet participating in the formation of protuberances of magnetic ink is mounted on the opposite electrodes of simple shape, thereby improving the efficiency of manufacture of the apparatus of this kind.

Figure 11:
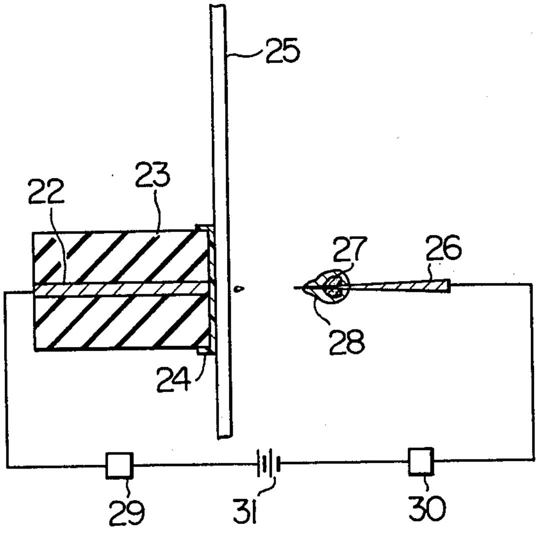
FIG. 11 shows schematically the structure of the recording section in a third embodiment of the present invention.

FIG. 11 shows the basic structure of the recoring section of this third embodiment. Referring to FIG. 11, an array of styli 22 each in the form of a copper wire 80 μm in diameter are arranged in equally spaced apart relation or at a pitch of 250 μm on the same plane and are securely held in a molded block 23 of an electrically insulating resin material to provide a stylus array type recording head. A dielectric film 24 about 20 μm thick is shown bonded to the front end of the stylus array type recording head for preventing occurrence of arc discharge. A recording sheet 25 is shown engaged by the recording head through this dielectric film 24. Fundamentally, this recording sheet 25 is as thin as possible for the achievement of the desired effect of image recording, and in practical applications, its thickness lies preferably within the range of 40 μm and 80 μm. An array of opposite electrodes 26 of strip shape each having a width of 7.5 mm and each in the form of a razor blade are made of a magnetic stainless steel. A pair of rubber magnets 27 each having an acute angled surface are bonded to the upper and lower surfaces respectively of the array of the opposite electrodes 26 in such directions that the magnets 27 repel each other. A protuberance 28 of magnetic ink is formed on the tip of each of the opposite electrodes 26 when the magnetic ink is supplied to this magnet pair 27. Signal sources 29 and 30 apply signal voltages to the stylus array and to the opposite electrode array respectively, and a bias power source 31 is connected between the signal sources 29 and 30. An image was recorded on the recording sheet 25 while maintaining the gap between the stylus array and the strip-shaped opposite electrode array at 0.3 mm, applying the signal voltages of 500 V to the styli 22 and to the strip-shaped opposite electrodes 26 from the sources 29 and 30 respectively, and applying a bias voltage of 1.2 kV from the bias power source 31. In this case, the signal application means of the form shown in FIG. 6 or FIG. 7 provided good results.

In this third embodiment, the flying point of the magnetic ink on the tip of each strip-shaped opposite electrode 26 of magnetic material is not especially limited. It is preferable, however, that the end edge at the tip of each strip-shaped opposite electrode 26 of magnetic material is corrugated to conform to the pitch of the associated styli 22. When the end edge at the tip of the opposite electrode 26 is shaped in the corrugated form, the protuberance of the magnetic ink conforms to the corrugation and appears most prominent on the ridges of the corrugation. When the strip-shaped opposite electrodes 26 having such an end edge contour are used for image recording while applying the bias voltage and signal voltages in the aforementioned manner, the bias voltage of 1.0 kV suffices for the purpose of image recoring. Thus, a record can be obtained at a lower value of the bias voltage, and the dots forming the record are more uniform in shape.

In lieu of corrugating the end edge at the tip of the strip-shaped opposite electrode, a magnetic stylus as described in the aforementioned first and second embodiments may be used to provide such an opposite electrode to exhibit the desired effect. The method of manufacturing such opposite electrodes is substantially similar to that used in providing the stylus array in the third embodiment. More precisely, in this modification, an array of wires of pure iron 60μ in diameter are arranged on a substrate at a line density of 4 per mm, that is, at a pitch of 250 μm which is equal to the pitch of the copper wires in the stylus type recording head. These magnetic styli are cut into a length of about 15 mm, and 32 styli constituting each group are electrically connected together to be electrically equivalent in potential. A rubber magnet, which is 1 mm thick, 5 mm wide and 200 mm long and which has a surface making an actute angle with the stylus array, is bonded to the stylus array at a position spaced by 0.5 mm from the front end of the stylus array to provide the opposite electrodes.

Figure 12:
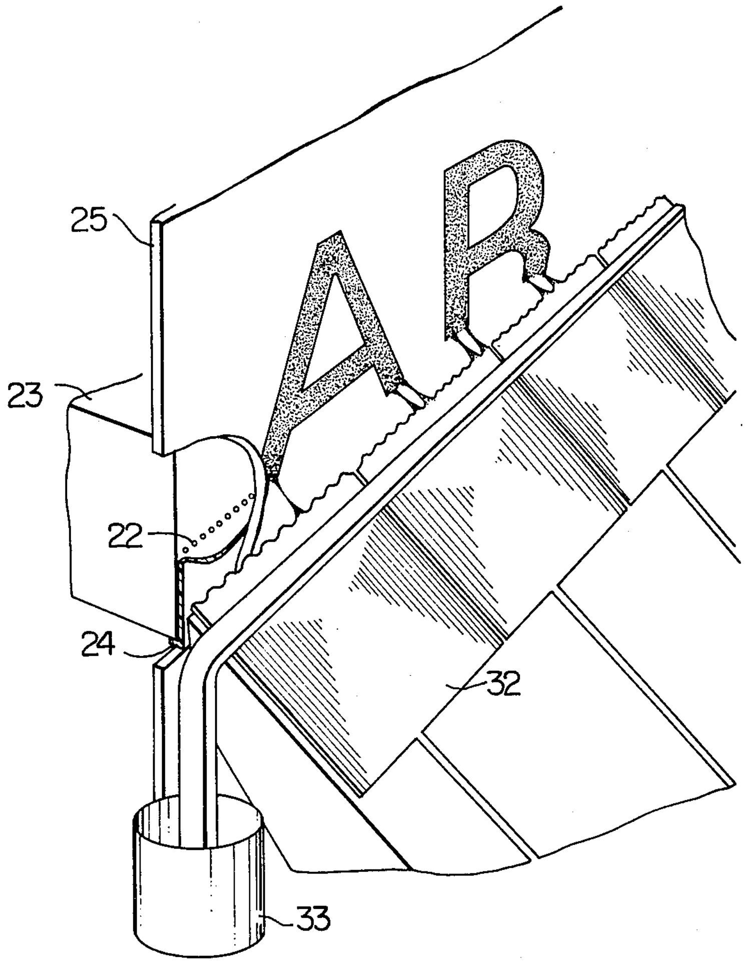
FIG. 12 shows, in an enlarged perspective fashion, the structure of the recording section in a modification of the third embodiment of the present invention.

FIG. 12 shows the structure of the recording section of this modification in an enlarged fashion. Referring to FIG. 12, the numeral 32 designates the opposite electrodes composed of the magnetic styli, and 33 designates a tank containing the magnetic ink. The rubber magnet is extended to terminate adjacent to this tank 33 so that the magnetic ink can be automatically supplied by the magnetic force. In this modification too, the signal application means shown in FIG. 6 or 7 can be sufficiently satisfactorily used.

It will be understood from the foregoing detailed description that the image recording apparatus according to the present invention comprises an array of styli regularly electrically connected at intervals of n (which is an integer) and an array of opposite electrodes each of which is disposed opposite to a plurality of the styli. Either the stylus or the opposite electrode is made of a magnetic material, and a protuberance of magnetic ink is formed on the tip of the stylus or the opposite electrode of magnetic material. A pulse signal having a constant frequency is applied in dot sequential fashion to one of the stylus array and the opposite electrode array, and a pulse signal processed to correspond to an image is applied to the other, so that protuberances of the magnetic ink formed on the selected styli or opposite electrodes in the stylus array and opposite electrode array applied with these two pulse signals simultaneously are let to fly toward and onto a recording sheet to reproduce a desired image on the recording sheet. The apparatus according to the present invention exhibits such meritorious effects that the number of parts of the signal application circuits can be reduced to increase the speed of recording, and an image of high dot density and high quality can be reproduced on a sheet of plain paper. Thus, the image recording apparatus finds wide applications in the field of image recording utilizing facsimiles, printers and recorders for the recording of images.

What we claim is:

1. An image recording apparatus of the kind comprising an array of styli arranged in equally spaced apart relation on the same plane and regularly electrically connected at internals of an integer of styli, an array of opposite electrodes arranged in equally spaced apart relation and in parallel with said stylus array, each of said opposite electrodes in said opposite electrode array being disposed opposite to a plurality of said styli in said stylus array, either said styli or said opposite electrodes being made of a magnetic material, and means for supplying a magnetofluidic material toward the tips of said styli or said opposite electrodes of magnetic material thereby forming protuberances of said magnetofluidic material on said tips by the magnetic force and letting the protuberances of said magnetofluidic material to selectively fly toward and onto a recording surface of a recording sheet for providing a record of a reproduced image on the recording surface of the recording sheet, wherein a pulse signal having a constant frequency is applied in dot sequential fashion to either one of said stylus array and said opposite electrode array, and a signal corresponding to an image is applied to another one.

2. An image recording apparatus as claimed in claim 1, wherein said styli are made of a magnetic material, and the protuberances of said magnetofluidic material are formed on the tips of said styli.

3. An image recording apparatus as claimed in claim 2, wherein a voltage is applied to said styli in such a polarity that said styli are positive relative to said opposite electrodes.

4. An image recording apparatus as claimed in claim 2, wherein said opposite electrode array is disposed on the back side of the recording sheet remote from the recording surface, and said stylus array is disposed opposite to the recording surface of the recording sheet.

5. An image recording apparatus as claimed in claim 4, wherein said stylus array is composed of (n×m) styli electrically connected at internals of n, and said opposite electrode array is composed of (2m+1) opposite electrodes.

6. An image recording apparatus as claimed in claim 2, wherein said opposite electrode array is in the form of an array of pairs of electrodes in which each pair of opposite electrodes are electrically equivalent in potential, and said stylus array is disposed opposite to the slit defined between the pairs of said opposite electrodes, so that said magnetofluidic material flies from the front end of said stylus array toward and onto the recording surface of the recording sheet through said slit.

7. An image recording apparatus as claimed in claim 6, wherein said stylus array is composed of (n×m) styli electrically connected at intervals of n, and said opposite electrode array is composed of (2m+1) pairs of opposite electrodes.

8. An image recording apparatus as claimed in claim 2, wherein, when the signal corresponding to the image or the pulse signal applied in dot sequential fashion is applied to one of said styli in said stylus array, said signal is not applied in concurrent relation to at least two styli disposed next adjacent to said stylus.

9. An image recording apparatus as claimed in claim 2, wherein said constant-frequency pulse signal is applied in dot sequential fashion to the individual styli in said stylus array, and the signal corresponding to the image is applied to said opposite electrodes in said opposite electrode array.

10. An image recording apparatus as claimed in claim 9, wherein said constant-frequency pulse signal is applied in dot sequential fashion to said styli at intervals of at least one stylus.

11. An image recording apparatus as claimed in claim 1, wherein said stylus array is disposed on the back side of the recording sheet remote from the recording surface, and said opposite electrode array is disposed opposite to the recording surface of the recording sheet with the front end of said opposite electrode array being corrugated at a pitch corresponding to the pitch of said styli in said stylus array, said opposite electrodes being made of a magnetic material, so that the protuberances of said magnetofluidic material are formed on the ridges of the corrugated front end of said opposite electrode array.

12. An image recording apparatus as claimed in claim 11, wherein each of said opposite electrodes is composed of a plurality of magnetic styli arranged in equally spaced apart relation on the same plane.

13. An image recording apparatus as claimed in claim 1, wherein said opposite electrode array or said stylus array which is not adapted to form the protuberances of said magnetofluidic material thereon is covered with a dielectric layer.

14. An image recording apparatus as claimed in claim 1, wherein a magnet provides the source of the magnetic force acting to form the protuberances of said magnetofluidic material and includes at least one acute angled surface, and said magnet is disposed on said stylus array or said opposite electrode array adapted for the formation of the protuberances of said magnetofluidic material in such a relation that said acute angled surface is directed toward the recording surface of the recording sheet.

15. An image recording apparatus as claimed in claim 14, wherein the acute angle defined between said acute angled surface of said magnet and a surface of said stylus array or said opposite electrode array is between 30° and 60°.

16. An image recording apparatus as claimed in claim 14, wherein said magnet is a rubber magnet or a plastic magnet.

17. An image recording apparatus as claimed in claim 14, wherein said magnet is bonded to said stylus array or said opposite electrode array of magnetic material adapted for forming the protuberances of said magnetofluidic material, by a bonding material layer having a thickness less than the value which is two times the diameter of said stylus.

* * * * *